United States Patent [19]

Shavit

[11] 4,220,238
[45] Sep. 2, 1980

[54] APPARATUS FOR ARRAYING RANDOMLY DISTRIBUTED OBJECTS

[75] Inventor: Henri Shavit, Arlesheim, Switzerland

[73] Assignee: Rondo, A.G., Allschwill-Basel, Switzerland

[21] Appl. No.: 848,748

[22] Filed: Nov. 4, 1977

[30] Foreign Application Priority Data

Nov. 12, 1976 [DE] Fed. Rep. of Germany ....... 2651664

[51] Int. Cl.³ .................. B65G 27/00; B65G 47/24
[52] U.S. Cl. .................................. 198/400; 198/406; 198/416; 198/446; 198/456; 198/492; 198/560; 198/747; 198/749; 221/241
[58] Field of Search .............. 198/398, 399, 406, 416, 198/445, 446, 453, 454, 456, 560, 562, 771, 400, 530, 532, 492, 747, 749, 752; 193/25 FT, 32, 38, 40, 47, 48, 46; 221/171, 172, 241, 268, 304, 312 R

[56] References Cited

U.S. PATENT DOCUMENTS

| 762,508 | 6/1904 | Weld | 193/32 |
|---|---|---|---|
| 1,677,938 | 7/1928 | Van Sickle | 221/241 |
| 1,869,653 | 8/1932 | Bauer | 221/241 |
| 1,971,292 | 8/1934 | Brauer | 198/771 X |
| 2,530,419 | 11/1950 | Bourland | 198/446 |
| 2,595,065 | 4/1952 | Evasic | 198/400 X |
| 2,704,144 | 3/1955 | Rety et al. | 193/38 |
| 2,969,866 | 1/1961 | Musgrave | 198/456 |
| 3,469,672 | 9/1969 | Stutske et al. | 198/446 X |
| 3,776,346 | 12/1973 | Dubuit | 198/400 X |

Primary Examiner—James L. Rowland
Attorney, Agent, or Firm—Peter K. Kontler

[57] ABSTRACT

Apparatus for arraying randomly distributed ampoules, bottles or like objects has a longitudinally grooved vibratory conveyor which receives randomly distributed objects from a magazine and converts the objects into files of aligned objects. The discharge end of the vibratory conveyor, or an intermediate conveyor, delivers the objects into a vertical duct having several longitudinally extending sections one of which is adjustable horizontally toward or away from the other section or sections to define a passage of optimum width for the selected objects. The lower end of the duct delivers successive objects onto a platform, and such objects are transferred sideways out of register with the duct by a reciprocable pusher. If the objects are bottles or the like, an orienting device is placed adjacent to the upper end of the duct to insure that the orientation of each bottle which enters the duct is the same. One or more sections of the duct are formed with vertically extending guide grooves for objects; each such groove has a V-shaped or trapezoidal outline, the same as the grooves of the vibratory conveyor.

27 Claims, 8 Drawing Figures

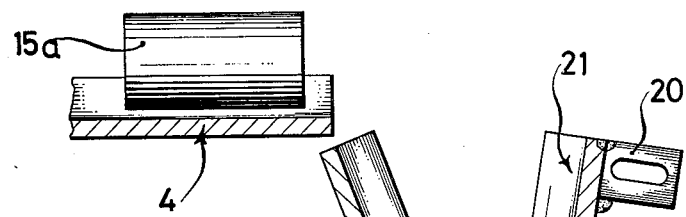
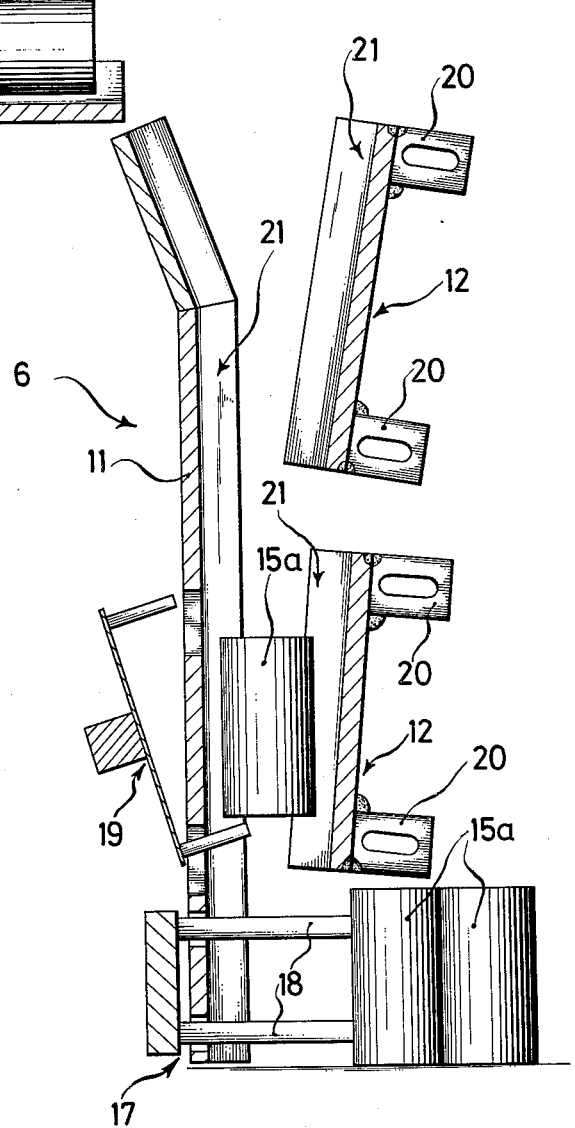
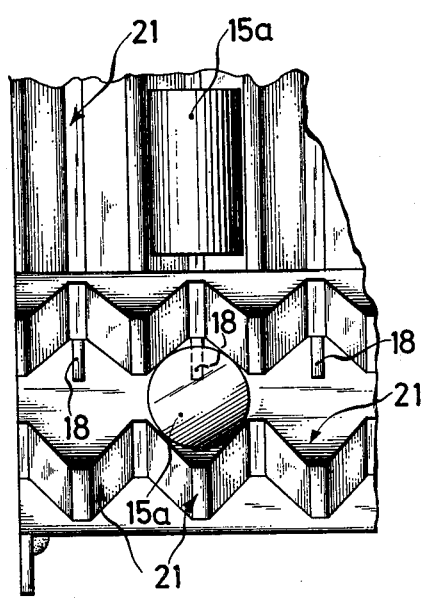
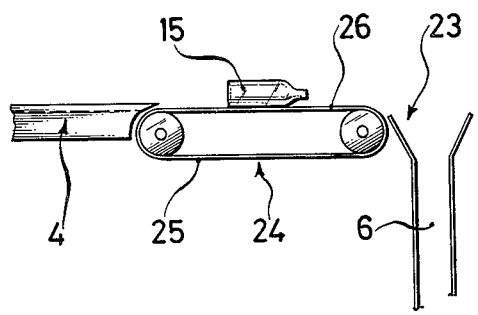

1

APPARATUS FOR ARRAYING RANDOMLY DISTRIBUTED OBJECTS

BACKGROUND OF THE INVENTION

The present invention relates to improvements in apparatus for converting randomly distributed discrete objects into orderly arrays, e.g., into rows, files, layers or analogous formations. More particularly, the invention relates to improvements in apparatus of the type wherein randomly distributed objects or articles are delivered to substantially continuously driven feeding conveyor means for transport into a chute or duct whence the objects are removed or expelled in the desired orientation and direction.

Apparatus of the above outlined character are often utilized for classification and/or arraying of ampoules, bottles, vials or analogous objects. A drawback of presently known apparatus is that the conversion from processing of one type of objects to the processing of another type of objects is time-consuming and complex. Moreover, each conversion necessitates replacement of at least one previously used component with a different component. For example, the aforementioned chute or duct must be replaced with a different chute or duct when the processing of ampoules or bottles having a first diameter is followed by processing of objects having a different second diameter.

OBJECTS AND SUMMARY OF THE INVENTION

An object of the invention is to provide a novel and improved apparatus for arraying ampoules, flasks, bottles, batteries, vials or analogous objects, especially elongated objects, whose versatility greatly exceeds the versatility of presently known apparatus.

Another object of the invention is to provide an arraying apparatus which can be converted for processing of differently dimensioned and/or configurated objects within a fraction of the time which is needed for such conversion of conventional apparatus.

A further object of the invention is to provide an apparatus wherein the conversion from processing of a first type of objects to the processing of a different second type of objects does not necessitate replacement of any components and wherein such conversion can be readily carried out by semiskilled or even unskilled persons.

An additional object of the invention is to provide a novel and improved duct or chute for use in an apparatus of the above outlined character.

Another object of the invention is to provide an apparatus which can process a wide variety of objects irrespective of the extent and/or nature of random distribution of such objects prior to entry into the apparatus.

An additional object of the invention is to provide an arraying apparatus which, even though especially suited for the processing of elongated cylindrical objects, can be used with advantage for the processing of other types of objects, for example, objects having a circular, oval or polygonal cross-sectional outline.

An ancillary object of the invention is to provide the apparatus with simple but efficient and reliable means for automatically changing the orientation of and the spacing between successive objects.

One feature of the invention resides in the provision of an apparatus for arraying randomly distributed bottles, vials, batteries, flasks, ampoules or analogous objects (particularly elongated objects). The apparatus comprises a substantially continuously driven feeding conveyor (such as a vibrating table the upper side of which is formed with one or more elongated V-shaped or trapezoidal grooves and which receives randomly distributed objects from a magazine or the like whereby the vibrating table converts such objects into one or more files, depending on the number of grooves) having a discharge end toward and beyond which the objects are advanced, a frame or an analogous support, and an upright duct having an upper end which is arranged to receive objects advancing beyond the discharge end of the feeding conveyor. The duct defines a passage wherein the objects descend and comprises a plurality of sections which bound the passage and extend lengthwise of the duct. The apparatus further comprises screws and lugs or analogous means for adjustably securing at least one of the sections to the support in at least two different positions in one of which the duct can receive and permit the descent of objects having a first cross-section and in the other of which the duct can receive and permit the descent of objects having a second cross-section.

At least one of the sections is preferably provided with at least one groove which faces the passage of the duct and has an outline similar to or identical with that of the groove or grooves in the feeding conveyor. The grooves are preferably V-shaped or trapezoidal, i.e., their width respectively increases gradually toward the upper side of the feeding conveyor and toward the passage of the duct.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a plan view of the structure shown in FIG. 2a;

FIG. 5 is an enlarged vertical sectional view of the duct in the apparatus of FIG. 1;

FIG. 6 is a plan view of the structure shown in FIG. 5; and

FIG. 7 is a schematic elevational view of a portion of a further apparatus.

DESCRIPTION OF THE PREFERRED EMBODIMENTS

Figure 1:
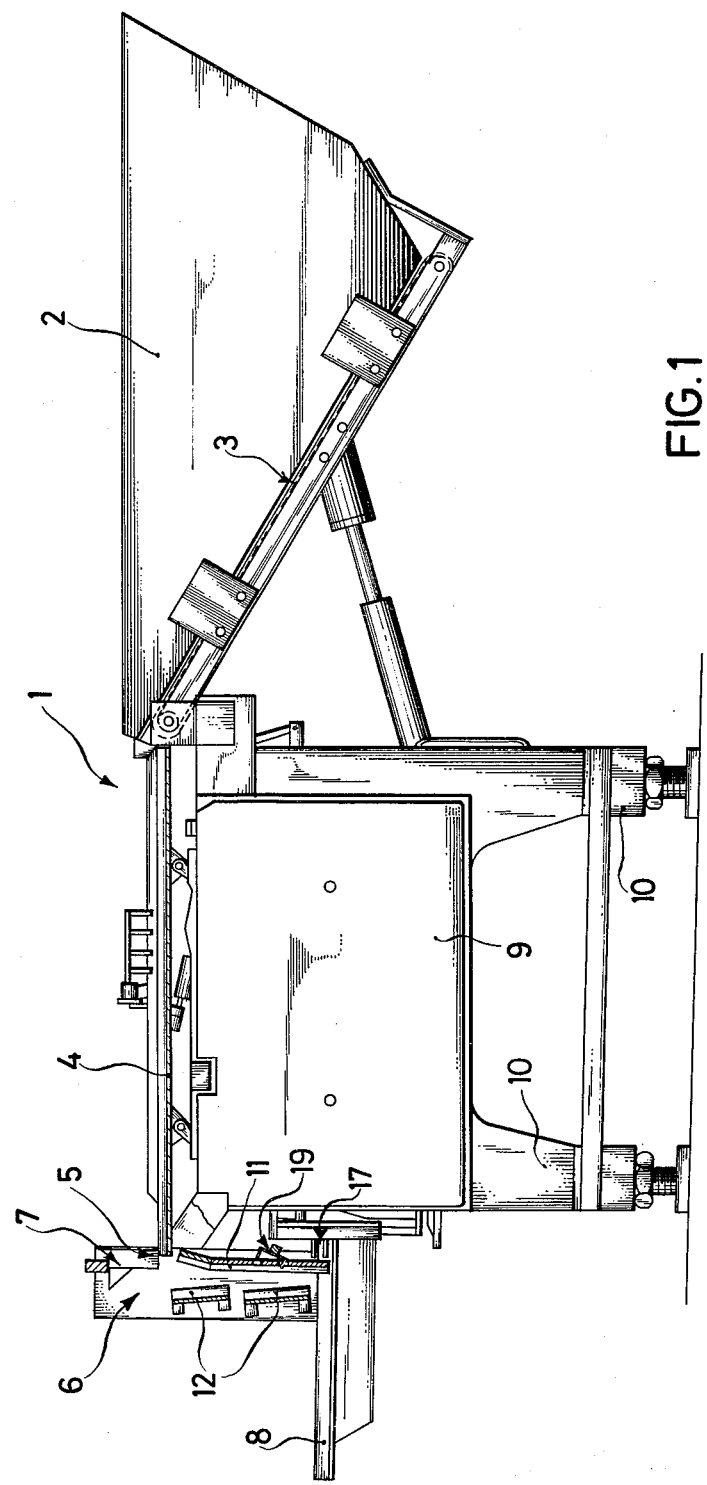
FIG. 1 is a partly side elevational and partly longitudinal vertical sectional view of an apparatus which embodies one form of the invention.

FIG. 1 shows an arraying apparatus 1 which comprises a frame or support 9 mounted on several vertically adjustable legs 10 which enable an attendant to change the inclination of a substantially horizontal and preferably continuously driven feeding conveyor 4 here shown as a vibratory conveyor or table. In the embodiment of FIG. 1, the discharge end 5 of the table 4 is disposed at a level below the receiving (right-hand) end; however, the effective length of front or rear legs 10 can be changed so as to place the upper side of the table into a horizontal plane or to move the discharge end 5 to a level above the receiving end.

Figure 2:
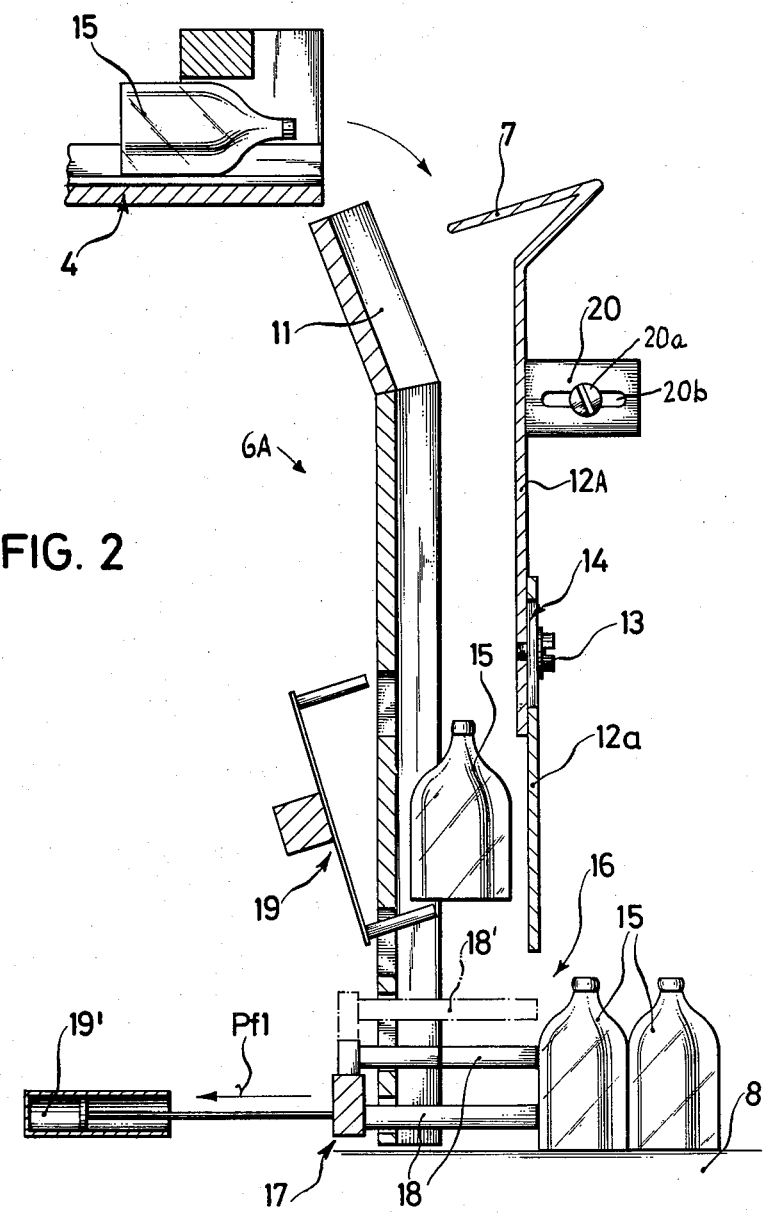
FIG. 2 is an enlarged longitudinal vertical sectional view of a portion of a second apparatus.

The frame 9 supports a tiltable magazine or hopper 2 for a supply of randomly distributed objects, e.g., flasks, bottles or vials 15 of the type shown in FIG. 2. A continuously or intermittently driven endless withdrawing conveyor 3 is installed in the bottom zone of the magazine 2; the upwardly sloping upper reach of this conveyor serves to deliver objects to the receiving end of the table 4. The inclination of the magazine 2 can be changed by a fluid-operated cylinder and piston unit which is articulately secured to the frame 9. The interior of the frame 9 contains a motor (not shown) which imparts vibratory movements to the table 4. FIG. 1 further shows that the inclination and/or level of the table 4 can be adjusted by a discrete cylinder and piston unit independently of adjustment of the legs 10.

The frame 9 further supports the sections 11 and 12 of a substantially vertical duct or chute 6 whose upper end is adjacent to the discharge end 5 of the table 4 and which is constructed and assembled in accordance with a feature of the invention. A tilting or orienting device 7 above the discharge end 5 of the table 4 serves to change (if necessary) the orientation of objects prior to entry into the duct 6. Such change in orientation is desirable when the objects are bottles or ampoules in order to insure that the objects will enter the duct 6 in upright position. A reciprocable transfer member or pusher 17 is provided to transfer successive objects from the space below the lower end of the duct 6 onto a receiving platform 8. This platform may be replaced by or may constitute a continuously or intermittently operated receiving conveyor.

FIG. 2 shows a portion of a modified arraying apparatus wherein the adjustable right-hand section of the chute or duct 6A comprises a main portion 12A, which is secured to the frame or support 9 (not shown in FIG. 2) by one or more screws 20a or analogous fasteners, and a detachable and adjustable downwardly extending lower portion 12a secured to the main portion 12A by one or more screws 13 or analogous clamping devices. The shank of the illustrated screw 13 extends through an elongated vertical slot 14 of the lower portion 12a and into a tapped bore of the main portion 12A. The orienting device 7 is integral with the upper part of the main portion 12A. The portions 12A and 12a of the right-hand section of the chute 6A are flat plate-like bodies, i.e., those sides thereof which face the vertical passage of the duct 6A are smooth.

In order to change the width of the passage of the duct 6A, an attendant loosens the screw or screws 20a so that the portion 12A can be shifted toward or away from the section 11. The portion 12A has a lug or bracket 20 provided with a horizontal slot 20b for the shank of the screw 20a. Thus, the illustrated structure enables the section including the portion 12A and extension 12a to move along a substantially horizontal path toward or away from the section 11.

Figure 4:
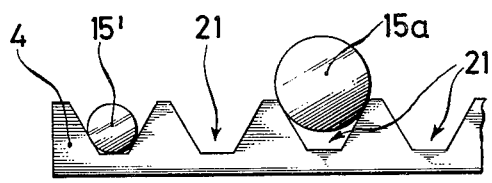
FIG. 4 is a front elevational view of the vibratory feeding conveyor of FIG. 2a, substantially as seen in the direction of arrow IV.

The inner side of the section 11 has one or more parallel vertical grooves or ways into which portions of the objects 15 extend during movement through the duct 6A. The grooves in the inner side of the section 11 have a V-shaped or trapezoidal cross-sectional outline (see the grooves 21 of the table 4 in FIG. 4). Similarity of grooves in the upper side of the table 4 and in the section or sections of the duct is desirable and advantageous because this insures continuous guidance of objects, in the same way, during travel toward as well as during descent in the duct.

The lower end of the portion 12a is located above an outlet opening 16 by way of which successive objects 15 are expelled from the space below the duct 6A. The means for transferring successive objects 15 through the opening 16 and onto the receiving platform 8 comprises the aforementioned reciprocable pusher 17 having one or more horizontal prongs 18 and being movable along a horizontal path in and counter to the direction indicated by arrow Pf1 by means of a suitable motor, e.g., a fluid-operated single-acting or double-acting cylinder and piston unit 19'. Since the illustrated motor 19' is of the single-acting type, the apparatus preferably further comprises one or more springs (not shown) which permanently urge the pusher 17 in a direction to the left, as viewed in FIG. 2. The upper prong 18 of the pusher 17 is preferably movable up and down relative to the lower prong (see the phantom-line upper end position 18' of the upper prong) to thus insure that the pusher will reliably transfer longer or shorter objects having identical or different cross-sectional outlines without the danger of tilting during expulsion via opening 16. The portion 12a will be moved up or down, depending on the length (height) of objects which descend in the duct 6A. The portion 12a insures that the objects 15 are adequately guided and confined during movement substantially all the way to the upper side of the platform 8.

The pusher 17 may be provided with one, two or more rows of parallel prongs 18 which extend through a slot in the lower portion of the section 11. FIG. 2 shows the pusher 17 in the extended position in which the prongs 18 have completed the transfer of an object 15 from the space below the passage of the duct 6A onto that portion of the upper side of the receiving platform 8 which is located to the right of the outlet opening 16.

In order to insure that the next-following object 15 will not interfere with the transfer of the object which already rests on the platform 8, the apparatus further comprises a pivotable intercepting or singularizing device 19 whose arms extend or can extend through openings in the section 11. The lower arm of the device 19 extends into the duct 6A to intercept the next-to-the-lowermost object 15 while the pusher 17 performs a forward stroke. The device 19 can be pivoted by a suitable mechanism in automatic response to retraction of the pusher 17 so that the object which was held by its lower arm can descend onto the platform 8. At the same time, the upper arm of the singularizing device 19 intercepts the object which is located at the general level of the screw 13.

Figure 2A:
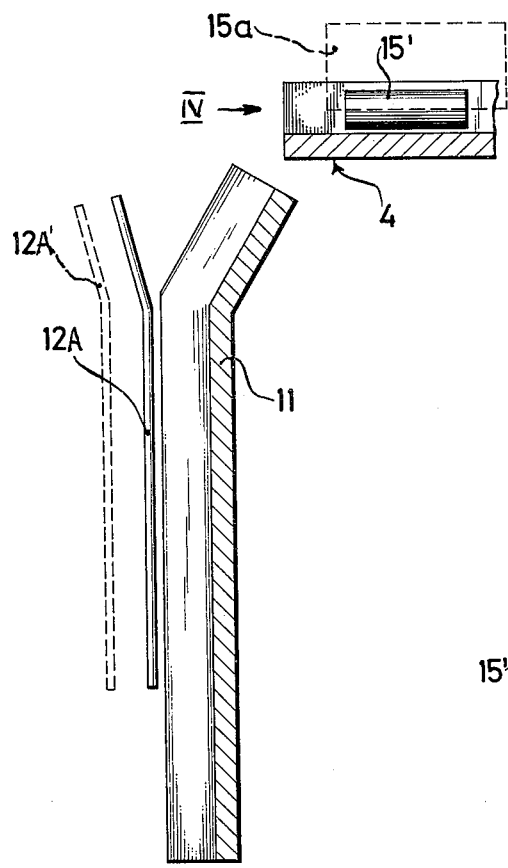
FIG. 2a is a schematic smaller-scale vertical sectional view of the duct in the apparatus of FIG. 2, a portion of one section of the duct being shown in two different positions.

It is clear that the means for adjustably securing the section including the portions 12A and 12a to the frame 9 of the improved apparatus can be modified in a number of ways without departing from the spirit of the invention. For example, the portion 12A may be provided with one or more followers received in suitable tracks of the frame 9 and the tracks may contain shiftable stops to arrest the portion 12A in a selected position. Also, a lever, a linkage or a system of gears can be used to shift the portions 12A and 12a toward or away from the other section 11 of the duct 6A. Two different positions of the portion 12A (with the orienting device 7 omitted) are shown in FIG. 2a. The portion 12A will assume the solid-line position when the objects (15') have relatively small diameters. If the objects 15' are to be followed by a series of larger-diameter objects (15a), the portion 12A is shifted to the broken-line position 12A' of FIG. 2a.

Figure 3:
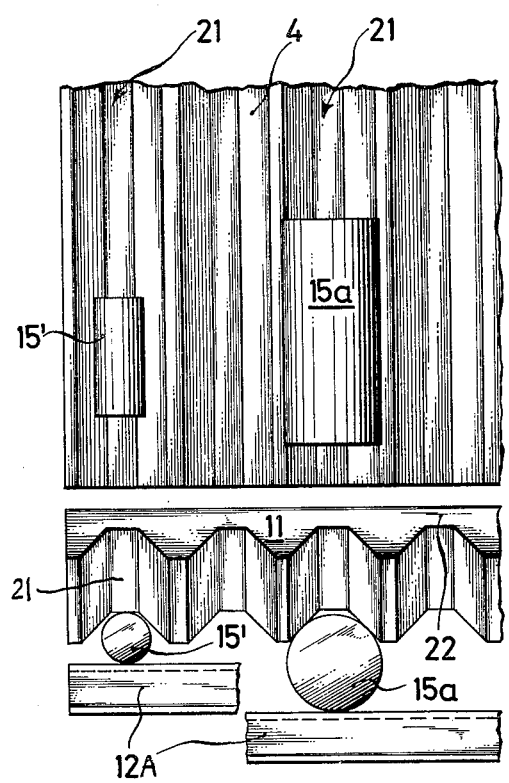

FIG. 3 shows that the upper side of the feeding table 4 has a plurality of parallel elongated grooves 21 which are closely adjacent to each other. Also, the section 11 of the duct 6A has a plate-like base 22 provided with a plurality of grooves 21 each in line with one of the grooves 21 at the upper side of the table 4. In other words, each horizontal or nearly horizontal groove 21 of the table 4 is located in a common vertical plane with a groove 21 of the section 11. As mentioned above, the grooves 21 have a V-shaped or trapezoidal outline. Such configuration insures highly satisfactory guidance of objects having different diameters or different cross-sectional configurations. FIG. 3 further shows the portion 12A of the left-hand duct section of FIG. 2 in two different positions which are selected in dependency on diameters of the objects (15' and 15a in FIG. 3). A smaller-diameter object 15' will enter deeper into the respective groove 21, and a larger-diameter object 15a will extend further beyond the groove; however, both objects are adequately guided during movement along the upper side of the table 4 as well as in the duct 6A. Since the feeding table 4 vibrates, each object 15' or 15a which is admitted onto the table in an orientation other than in parallelism with a groove 21 automatically finds its way into the groove and moves lengthwise on toward the discharge end 5.

FIGS. 5 and 6 show the duct 6 of FIG. 1. The main difference between the ducts 6 and 6A is that the right-hand duct section of FIG. 5 comprises several discrete units 12 and also that each such unit has a grooved side facing the section 11. The orienting device 7 is omitted because the objects 15a are identical at both ends so that it is immaterial which of their ends is located below the other end during travel between the sections of the duct 6. Each groove 21 of a unit 12 is located opposite a groove 21 of the section 11.

The units 12 are inclined with respect to each other and/or with respect to the section 11. Each of these units has two lugs 20 which can be adjustably secured to the frame 9 in a manner as shown in FIG. 2. Each unit 12 defines with the adjacent portion of the section 11 a substantially funnel-shaped downwardly tapering part of the passage in the duct 6. The inclination of units 12 with respect to the section 11 (especially of the upper unit) allows for convenient entry of successive objects 15a into the duct 6. The manner in which the units 12 are adjustable toward or away from the section 11 in order to insure adequate guidance of larger- or smaller-diameter objects is the same as described above, i.e., the units 12 are movable along substantially horizontal paths to increase or reduce the width of the passage between the right-hand and left-hand grooves 21 of FIG. 5. Each unit 12 is tiltable with respect to the frame 9.

It is further possible to move the upper and/or lower unit 12 of FIG. 5 up or down. This can be readily achieved by attaching the lugs 20 to analogous lugs or plates which are adjustable up and down relative to the frame 9.

FIG. 6 shows that the prongs 18 of the pusher 17 can form one or more rows, i.e., that at least one prong can be provided for each groove 21 of the section 11. Thus, the duct 6 can simultaneously convey several columns of objects so that the receiving platform 8 accumulates a battery of arrayed objects wherein the objects form several files extending in parallelism with the prongs 18 as well as several rows extending at right angles to the direction of reciprocatory movement of the pusher 17.

As shown in FIG. 7, the discharge end of the table 4 can deliver one or more files of objects 15 onto the upper reach 26 of a belt or an analogous endless flexible element 25 of an intermediate conveyor 24 which delivers the articles into the upper end 23 of the duct 6. The upper side of the upper reach 26 is preferably flush with the upper side of the feeding table 4 to insure unimpeded transfer of objects onto the conveyor belt 25. An advantage of the apparatus which includes the intermediate conveyor 24 of FIG. 7 is that the objects 15 do not vibrate during the last stage of movement toward and during entry into the duct 6. This is especially desirable if the apparatus comprises an orienting device whose operation is more reliable if the oncoming objects do not perform any vibratory or other stray movements.

It is clear that the intermediate conveyor 24 can be combined with means for guiding the objects 15 during transport toward the duct 6. Such guide means may include rolls or analogous elements which support the objects 15 from below, from above and/or from one or both sides. The rolls prevent pronounced changes in orientation of objects 15 during travel toward the upper end 23 of the duct 6.

The angle between the surfaces flanking the V-shaped or trapeziform grooves 21 is preferably between 60 and 120 degrees, most preferably substantially 90 degrees.

An important advantage of the improved apparatus is that its conversion for processing of differently configurated or dimensioned objects requires a minimum of time. All that is necessary is to shift one section of the duct toward or away from the other section; this renders it possible to process objects having different diameters and/or different cross-sectional configurations. The apparatus has been found to be especially suited for arraying elongated objects. As mentioned above, adjustments of the duct can be carried out by a semiskilled or unskilled person.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In an apparatus for arrying randomly distributed elongated objects of at least two types each having a different cross-section, the combination of a substantially continuously driven feeding conveyor having an upper side provided with at least one elongated groove for reception and transport of the elongated objects therein with the longitudinal axes of the objects oriented longitudinally of the groove, said conveyor having a discharge end toward and beyond which the elongated objects are advanced; a support, an upright duct having an upper end arranged to receive the elongated objects which advance beyond said discharge end and defining an elongated passage wherein the elongated objects descend with the longitudinal axes thereof extending longitudinally of the passage, said duct comprising at least two sections bounding said passage, of said sections including two discrete portions one of which is located below the other, and means for fastening said portions to each other for adjustment of said one portion relative to said other portion in the longitudinal direction of said duct; and means for securing said sections to said support for adjusting movement of at least said one section toward and away from the other section between at least two different positions in one of which said passage has such transverse dimensions that it can guidingly receive and permit the longitudinal descent of one of the types of the elongated objects having a first cross-section, and in the other of which said passage has such transverse dimensions that it can guidingly receive and permit the longitudinal descent of the other type of the elongated objects having a second cross-section.

2. The combination of claim 1, wherein said sections extend lengthwise of said duct.

3. The combination of claim 1, wherein at least one of said sections has at least one groove facing said passage and having an outline which is at least similar to the outline of said first mentioned groove.

4. The combination of claim 3, wherein the width of said first mentioned groove increases gradually toward said upper side and the width of said last mentioned groove increases gradually in a direction toward said passage.

5. The combination of claim 3, wherein said grooved section includes a plate-like base and said groove thereof is substantially vertical, the grooves of said conveyor and said grooved section being located in a common substantially vertical plane.

6. The combination of claim 1, wherein said one section has a substantially flat surface facing said passage.

7. The combination of claim 1, wherein said one section is adjustable along a substantially horizontal path.

8. The combination of claim 1, wherein said sections have elongated grooves facing said passage and each groove of one of said sections is located opposite a groove of another of said sections.

9. The combination of claim 1, wherein each of said sections has similar grooves facing said passage and extending lengthwise of said duct, each groove of one of said sections facing a groove of another of said sections.

10. The combination of claim 1, wherein said one section includes two discrete portions and further comprising means for adjustably fastening said portions to each other.

11. The combination of claim 1, wherein one of said portions has an elongated slot and said fastening means includes a clamping member connected to the other of said portions and extending through said slot.

12. The combination of claim 1, further comprising orienting means for objects which are about to enter said duct.

13. The combination of claim 1, further comprising a singularizing device adjacent to said duct and having means for temporarily intercepting successive objects in said passage.

14. The combination of claim 1, further comprising means for receiving objects from said duct, said receiving means and at least one section of said duct defining an outlet opening at the lower end of said duct, and further comprising means for transferring objects from said duct onto said receiving means by way of said opening.

15. The combination of claim 14, wherein said transferring means comprises a reciprocable pusher having at least two object-engaging prongs arranged to transfer objects from said duct onto said receiving means by way of said opening while said pusher performs a forward stroke.

16. The combination of claim 1, further comprising an intermediate conveyor disposed between the discharge end of said feeding conveyor and the upper end of said duct.

17. The combination of claim 16, wherein said intermediate conveyor comprises an endless flexible element having an upper reach substantially flush with the upper side of said feeding conveyor.

18. The combination of claim 1, wherein said one section comprises a plurality of units which are disposed one above the other.

19. The combination of claim 1, wherein said securing means includes at least one lug rigid with said one section and having at least one elongated slot, and fastener means extending through said slot and carried by said support.

20. The combination of claim 1, wherein said groove has a V-shaped outline.

21. The combination of claim 1, wherein said groove has a trapezoidal outline.

22. The combination of claim 1, wherein said feeding conveyor has two surfaces flanking said groove and making an angle of between 60 and 120 degrees.

23. In an apparatus for arrying randomly distributed elongated objects of at least two types each having a different cross-section, the combination of a substantially continuously driven feeding conveyor having an upper side provided with at least one elongated groove for reception and transport of the elongated objects therein with the longitudinal axes of the objects oriented longitudinally of the groove, said conveyor having a discharge end toward and beyond which the elongated objects are advanced; a support; an upright duct having an upper end arranged to receive the elongated objects which advance beyond said discharge end and defining an elongated passage wherein the elongated objects descend with the longitudinal axes thereof extending longitudinally of the passage, said duct comprising at least two sections bounding said passage, one of said sections including a plurality of units which are disposed above one another and means for securing said sections to said support for adjusting movement of at least one of said units in the longitudinal direction of said duct, and of at least said one section toward and away from the other section between at least two different positions in one of which said passage has such transverse dimensions that it can guidingly receive and permit the longitudinal descent of one of the types of the elongated objects having a first cross-section, and in the other of which said passage has such transverse dimensions that it can guidingly receive and permit the longitudinal descent of the other type of the elongated objects having a second cross-section.

24. The combination of claim 23, wherein said one unit is adjacent to the lower end of said passage.

25. The combination of claim 23, wherein each of said units is adjustable relative to said support.

26. The combination of claim 25, wherein at least one of said units is tiltable with respect to said support.

27. In an apparatus for arraying randomly distributed objects, particularly elongated objects, the combination of a substantially continuously driven feeding conveyor having an upper side provided with at least one elongated groove for reception and transport of objects therein, said conveyor having a discharge end toward and beyond which the objects are advanced; a support; an upright duct having an upper end arranged to receive objects which advance beyond said discharge end and defining a passage wherein the objects descend, said duct comprising a plurality of sections bounding said passage; means for adjustably securing at least one of said sections to said support for movement between at least two different positions in one of which said duct can receive and permit the descent of objects having a first cross-section and in the other of which said duct can receive and permit the descent of objects having a second cross-section; means for receiving objects from said duct, said receiving means and at least one section of said duct defining an outlet opening at the lower end of said duct; and means for transferring objects from said duct onto said receiving means by way of said opening, said transferring means comprising a reciprocable pusher having at least two object-engaging prongs arranged to transfer objects from said duct onto said receiving means by way of said opening while said pusher performs a forward stroke, at least one of said prongs being shiftable relative to the other of said prongs.

* * * * *